United States Patent [19]

Eidsmore

[11] Patent Number: 5,547,229
[45] Date of Patent: Aug. 20, 1996

[54] FLUID COUPLING ASSEMBLY

[76] Inventor: Paul G. Eidsmore, 1700 Granite Creek Rd., Santa Cruz, Calif. 95065

[21] Appl. No.: 392,104

[22] Filed: Feb. 22, 1995

Related U.S. Application Data

[63] Continuation-in-part of Ser. No. 242,374, May 13, 1994.

[51] Int. Cl.$^6$ ................................................ F16L 35/00
[52] U.S. Cl. .......................... 285/93; 285/328; 285/353; 285/384; 285/387; 285/422
[58] Field of Search ................................. 285/353, 384, 285/419, 422, 387, 328, 93

[56] References Cited

U.S. PATENT DOCUMENTS

| | | |
|---|---|---|
| 405,745 | 6/1889 | Ross . |
| 473,462 | 4/1892 | Hogan .................................. 285/419 X |
| 498,876 | 6/1893 | Bells .................................... 285/353 X |
| 568,996 | 10/1896 | Totham . |
| 919,913 | 4/1909 | Miller ...................................... 285/384 |
| 1,326,970 | 1/1920 | Row et al. . |
| 1,455,971 | 5/1923 | Rickenbacker et al. . |
| 1,525,233 | 2/1925 | Erickson . |
| 1,589,781 | 6/1926 | Anderson . |
| 2,926,027 | 2/1960 | Marquis, Jr. . |
| 3,113,792 | 12/1963 | Brown . |
| 3,428,337 | 2/1969 | Read . |
| 3,521,910 | 7/1970 | Callahan, Jr. et al. . |
| 4,544,185 | 10/1985 | Weirich, et al. . |
| 4,634,154 | 1/1987 | Arora et al. ......................... 285/387 X |
| 4,778,204 | 10/1988 | Berger .................................. 285/387 X |
| 4,784,412 | 11/1988 | Van Dongen ........................... 285/387 |
| 5,088,773 | 2/1992 | Gralenski . |
| 5,350,205 | 9/1994 | Aldridge et al. ..................... 285/422 X |
| 5,393,109 | 2/1995 | Gumpel ................................ 285/422 X |

FOREIGN PATENT DOCUMENTS

| | | |
|---|---|---|
| 491795 | 11/1975 | U.S.S.R. . |
| 777322 | 12/1980 | U.S.S.R. .............................. 285/387 |

OTHER PUBLICATIONS

Gall–Tough Brochure.

*Primary Examiner*—Dave W. Arola
*Attorney, Agent, or Firm*—Fay, Sharpe, Beall, Fagan, Minnich & McKee

[57] ABSTRACT

A new fluid coupling assembly includes a split male nut positioned over a coupling member or gland of a fluid system. The split male nut members are preferably formed of a precipitation hardenable material. Various interlock arrangements facilitate assembly of the split male nut halves. Moreover, providing indicia on the male nut halves assists in forming the threads and subsequent assembly. A female nut assembly includes a pair of inserts that are secured together by a collar having a shoulder defined by a counterbore. An external portion of the shoulder overlaps a counterbore formed therein to increase the strength of the female nut assembly.

13 Claims, 8 Drawing Sheets

FLUID COUPLING ASSEMBLY

This is a c-i-p of U.S. Pat. No. 242,374, filed May 13, 1994.

BACKGROUND OF THE INVENTION

This invention pertains to the art of coupling arrangements and more particularly to fluid coupling assemblies of the type where first and second fluid components, such as axially aligned glands are brought into sealing engagement and provide a face seal. A widespread, commercially successful version of one face seal type of fluid coupling employs a circumferentially continuous bead on a radial end face of the gland. A gasket is interposed between the opposed beads and the glands urged into fluid-tight relationship with opposite faces of the gasket by virtue of a threaded nut arrangement.

For example, the first gland is provided with a shoulder axially or longitudinally spaced from the end face and that abuttingly engages a corresponding shoulder at one end of a coupling nut. An opposite end of the nut is internally threaded to cooperate with external threads associated with the second coupling gland. The external threads are oftentimes formed directly on the second gland at a region spaced from the end face of the second gland, or may be associated with a separate nut member that likewise abuttingly engages a radial shoulder on the second coupling gland. A commercially successful version of this fluid coupling assembly is shown and described in U.S. Pat. No. 3,521,910 of Callahan, Jr., et al.

The coupling glands are usually associated with other components of the fluid system. For example, the ends of the glands remote from the sealing end faces are secured to fluid lines, pressure regulators, valves, etc. As will also be recognized by those skilled in the art, these types of fluid couplings are often used in ultra pure environments where high degrees of cleanliness are required. Steps must be taken, for example, when a welded interconnection is made between the first gland and the fluid component to address the cleanliness problem. Likewise, requirements imposed by semiconductor chip manufacturers have forced fluid coupling suppliers to evaluate all components, and portions of components, of the coupling assemblies in an effort to meet the particle standards.

Yet another problem associated with securing the gland member to the fluid component relates to misalignment due to welding. Occasionally, the first gland is warped or non-aligned relative to its ideal location in connection with a stub or other connection associated with the fluid component. Aside from any aesthetic concerns, non-alignment can adversely impact the connection and alignment of other components in the fluid system.

It is also desirable to maintain overall strength of the components and provide for ease of manufacture. Although all of these concerns may idealistically be satisfied through meticulous attention to quality control during manufacture, the overall process and assembly must be economically competitive and result in a product that offers advantages over presently available arrangements.

Accordingly, these concerns and others have not been adequately addressed in prior art fluid couplings of the face seal type.

SUMMARY OF THE INVENTION

The present invention contemplates a new and improved fluid coupling assembly that overcomes these problems and others and provides a simple, economical, clean, and accurate fluid coupling arrangement for securing together components in a fluid system.

According to the present invention, there is provided a connection member, for example a male or female nut that has at least a portion thereof longitudinally split to allow the nut to be secured in place after the gland has been secured to the fluid component or if the gland is integrally formed with the fluid component. The connection member is manufactured so that first and second split components are interchangeable with first and second components of another connection member.

According to another aspect of the invention, the first and second components of the connection member are provided with indicia to facilitate subsequent assembly of individual components from different connection members.

According to still another aspect of the invention, the separate components of the split connection member are held together by one of various interlock arrangements.

According to yet another aspect of the invention, an outer dimension of the split connection member of the female nut assembly overlaps the shoulder to provide increased strength.

A principal advantage of the invention is the ability to join separate first and second components and obtain a connection member with aligned threads.

Another advantage of the invention resides in the increased strength of the connection member.

Yet another advantage is associated with the use of a selected materials that address galling and particle problems associated with these ultra clean coupling assemblies.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
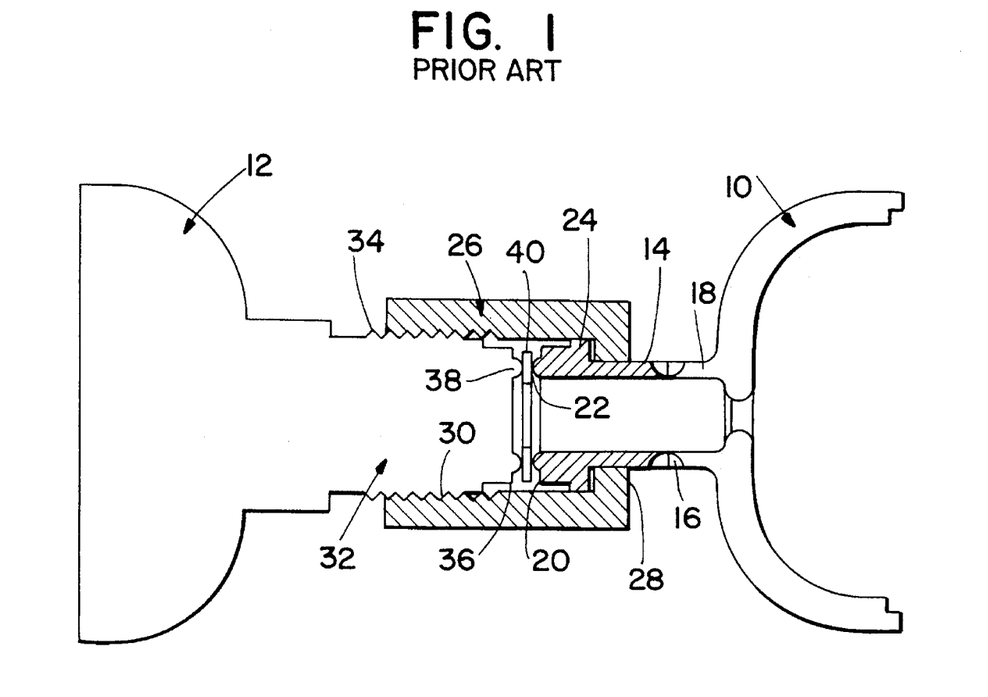
FIG. 1 is a sectional view of a fluid system in accordance with a prior art coupling assembly arrangement.

Referring now to the drawings wherein the showings are for purposes of illustrating the preferred embodiments of the invention only and not for purposes of limiting same, the FIGURES show a fluid system A in which fluid components B are interconnected by a coupling assembly C. As shown in FIG. 1, reference is initially made to a prior art arrangement or fluid system A in which a first fluid component 10 is connected to a second fluid component 12 by a known coupling assembly B. The coupling assembly includes a first coupling member or gland 14 welded at 16 to a stub or extension 18 that extends outwardly from the first fluid component. The first coupling member includes an end face 20 having a circumferentially continuous bead 22 protruding therefrom. Disposed axially from the end face is an enlarged radial shoulder 24.

The shoulder 24 cooperates with a connection member or coupling nut 26, particularly a radially inwardly extending shoulder 28 of a female coupling nut. An outer end of the coupling nut is internally threaded at 30 for engagement with a second coupling gland 32. Particularly, the coupling nut engages an external threaded region 34 that is integrally formed as an extension of the second fluid component or may be a separate member that is secured to the second gland, such as through a welding operation, in substantially the same manner as described above with respect to the first gland. The second coupling gland also includes a sealing end face 36 that has a bead 38 protruding therefrom in facing relation to the first coupling gland.

Preferably a gasket or seal member 40 is interposed between the beads for establishing an effective sealed arrangement. The gasket is typically formed from a material softer than the beads of the first and second glands. When the glands are axially advanced toward one another by rotating the coupling nut onto the threads 34, a sealed coupling assembly is achieved as the beads establish sealing contact with opposite faces of the gasket. Again, this is one type of a face seal assembly used in an ultra clean environment although it will be understood that the subject invention may also be applicable to still other face seal assemblies than the above described protruding bead and gasket assembly.

Since the through opening that defines the shoulder 28 of the female coupling nut has a smaller internal diameter than shoulder 24 of the first gland, it is necessary to position the female coupling nut 26 over the gland prior to welding the first gland at 16 to the fluid component 10. During this welding operation, the nut 26 freely dangles over the first gland. Accommodations must be made to assure that the coupling nut does not interfere with the welding operation or final welded connection. Again, details of this type of conventional coupling assembly are well known in the art.

Figure 2:
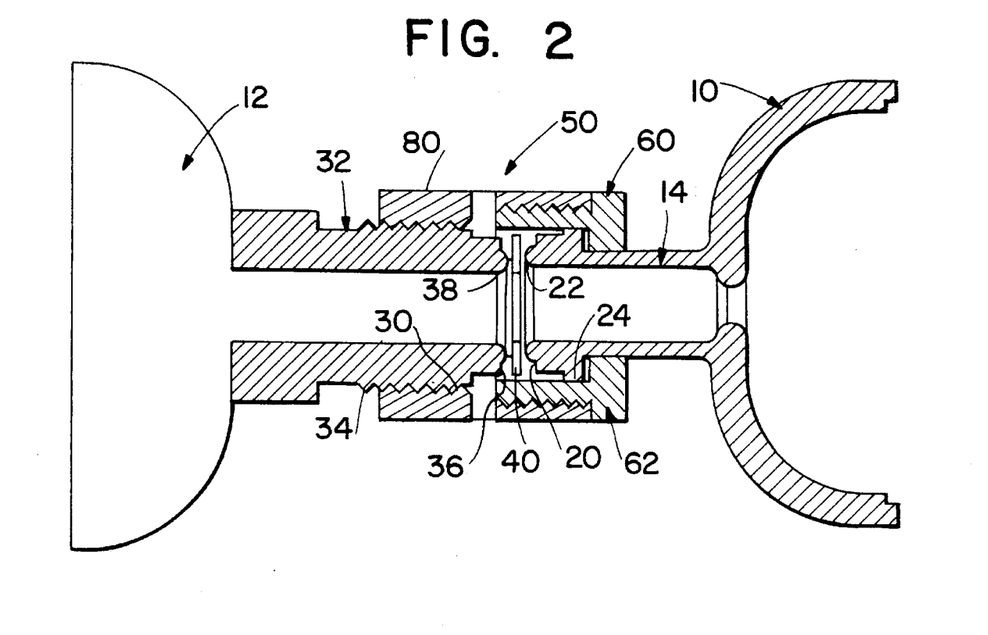
FIG. 2 is a longitudinal cross-sectional view of a fluid system similar to FIG. 1 and incorporating a new coupling assembly, particularly a female nut assembly.
Figure 3:
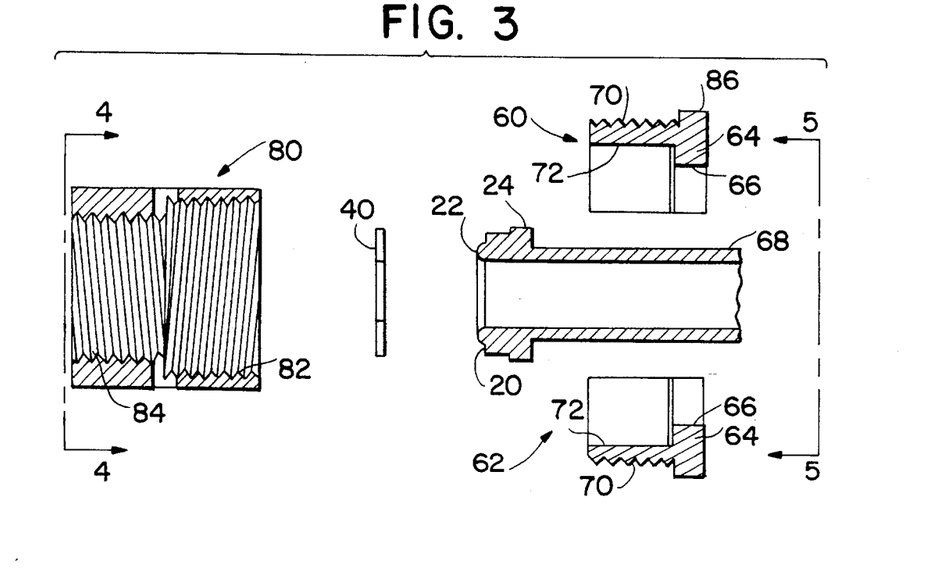
FIG. 3 is an exploded view of the subject new coupling assembly shown in FIG. 2.

FIGS. 2 and 3 show a new coupling assembly 50 for joining together first and second coupling members or coupling glands. Like numerals will be used to refer to like components while new numerals will refer to the new coupling assembly. As is evident from a comparison of FIGS. 1 and 2, the overall fluid system is generally the same, although the first gland 14 is shown as being integrally formed with the second fluid component 12 for reasons which will become more apparent below. The modified coupling assembly or female nut assembly 50 comprises three major components. Specifically, first and second split insert halves 60, 62 define two of the three major components of the female nut assembly. Description of one split insert half is equally applicable to the other so that common reference numerals will be used to indicate like elements. Each split insert half has an enlarged shoulder 64 (FIG. 3) at a first end that has an inner predetermined dimension defined by a recess 66 that, when combined with the other split insert half, closely matches the external diameter 68 of the first gland. As is also apparent, the recess 66 is dimensioned substantially less than the radial shoulder 24 of the first gland.

The opposite end of each split insert half has a threaded region preferably defined by an external threaded region 70. Although other thread pitch and hand arrangements can be used, in accordance with a preferred arrangement, the external threads 70 have a twenty pitch left-hand thread. A counterbore 72 extending inward from the opposite end of each split insert half has a diameter sufficiently greater than that of shoulder 24 of the first gland. When arranged in cooperative engagement as shown in FIG. 2, the split insert halves define a circumferentially continuous shoulder 64 that abuttingly engages a radial face of shoulder 24 on the first gland. Likewise, the circular recess or counterbore 72 is closely received over the radial shoulder 24 and extends axially a distance beyond the end face 20 and bead 22 of the first coupling gland. The split insert halves preferably terminate adjacent the location of the end face 36 of the second coupling gland 32 with the sealing gasket 40 being received between the circular beads 22, 38 (FIG. 2).

A third component of the new female nut assembly is defined by a body member 80. As best shown in FIG. 3, the body member is of annular configuration, i.e., circumferentially continuous, and has first and second threaded regions 82, 84. The first threaded region 82 defines a set of internal threads that extend axially inward from a first end of the body member and terminate approximately mid-way therein. The threads have the same pitch and hand as the threads 70 defined by the split insert halves.

The second threaded region 84 extends axially inwardly from the opposite end of the body member. The second threaded region has a preselected pitch and hand that mates with the thread pitch and hand 34 of the second gland 32. Although not limited thereto, in a preferred embodiment, the second threaded region has an eighteen pitch right-hand thread. Thus, the second threaded region of the body member is of opposite hand from the first threaded region, and has a different pitch. This relationship of the opposite hand and different pitches for the first and second threaded regions assures that the body member will not loosen but will tighten on the split insert halves of the female nut assembly. That is, once the split insert halves abut against the first gland and friction develops between the contacting shoulders 24, 64 and limits rotation of the split insert halves relative to the first gland, the opposite thread and different thread pitches will encourage the body member to tighten on the split insert halves.

As referenced above, the first gland can now be integrally formed with the fluid component 10 with which it is associated in accordance with the teachings of the present invention. Stated another way, a single piece of stock material can be machined to form at least a portion of the fluid component 10, as well as the first gland 14. This eliminates the need for any welded or similar fusion bonded connection 16 as employed in the prior art. In turn, this eliminates problems with regard to cleanliness, misalignment, and concern with controlling the coupling nut during the welding, electropolishing or plating operation of the prior art first gland to stub 18. With the teachings of the subject invention, the gland can be electropolished before the nut is positioned in place. This eliminates prior requirements for special handling of the coupling nut during the electropolishing process.

In contrast, the split insert halves 60, 62 of the present invention are received over the first gland and located so that the radial shoulders 64 abuttingly engage the rear radial face of the shoulder 24. Since the insert halves are split, they can be advanced in separated, radially spaced relation over the first gland in a direction proceeding from the end face 20 toward the shoulder 24 without complication. Once positioned behind the shoulder 24, the insert halves are radially brought together to cooperate with the rear, radial face of the shoulder 24 of the first gland. Thereafter, the outer body 80 is advanced axially over the end face 20 of the first gland whereby threaded regions 70, 82 of the split insert halves and body member, respectively, cooperate to interconnect the three components of the new coupling assembly or female nut assembly. Continued relative rotation between the split insert halves and the body member advances the threaded region 70 into the body member until a radial outer portion 86 of the shoulder 64 abuts the first end of the body member (FIG. 2). At this juncture, the new female nut assembly serves the same function as the female coupling nut of the prior art arrangement. That is, threaded region 84 cooperates with the external threaded region 34 of the second gland 32 to complete make-up between the first and second glands and provide a sealed interface on opposite faces of the gasket 40.

Figure 4:
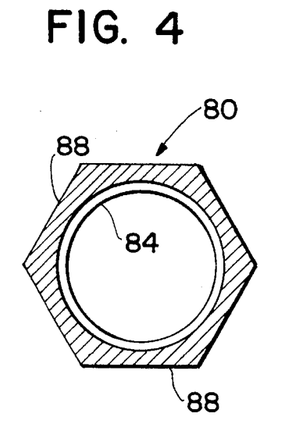
FIG. 4 is an end view of the body member taken generally along the lines 4—4 of FIG. 3.

To facilitate make-up of the coupling assembly, the body member 80 includes tool flats 88 on its exterior. Preferably, two or more tool flats are used, although a hexagonal outer configuration is commonly used in the industry (FIG. 4).

Figure 5:
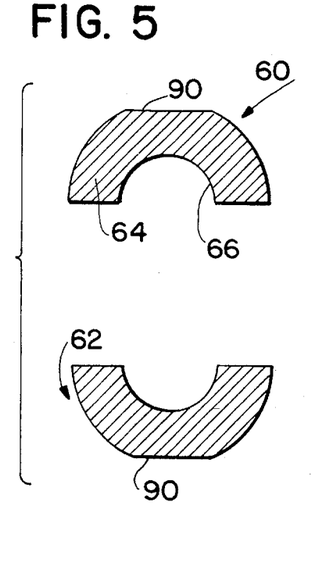
FIG. 5 is an end view of the split connection member taken generally along the lines 5—5 of FIG. 3.
Figure 6:
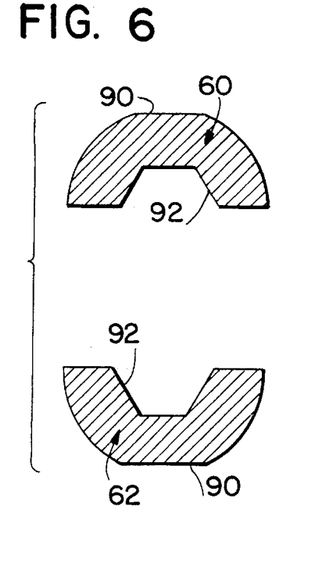
FIG. 6 is an end view of an alternative embodiment similar to FIG. 5.

In a similar manner, tool flats 90 are preferably provided on an external surface of the split insert halves. As best shown in FIGS. 5 and 6, each split insert half has a tool flat 90 so that when assembled, they form diametrically opposite tool-engaging surfaces which are parallel to the parting plane between the insert halves. As will be understood by one skilled in the art, still other tool flat arrangements or methods and structures for engaging the components can be used without departing from the scope and intent of the subject invention.

As additionally shown, an inner recess 66 of an insert half (FIG. 5) can be modified to a non-round configuration 92 (FIG. 6). If the first gland has a similarly configured surface, relative rotation between the split insert halves and the gland can be eliminated.

Figure 7:
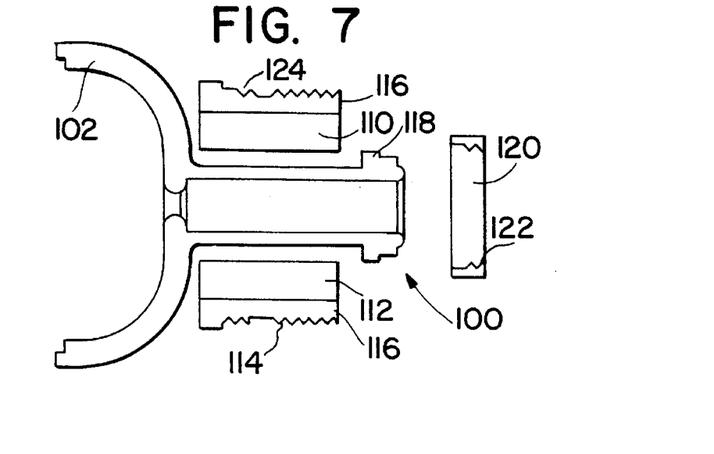
FIG. 7 is an exploded view of a similar split connection assembly for a male nut assembly.
Figure 8:
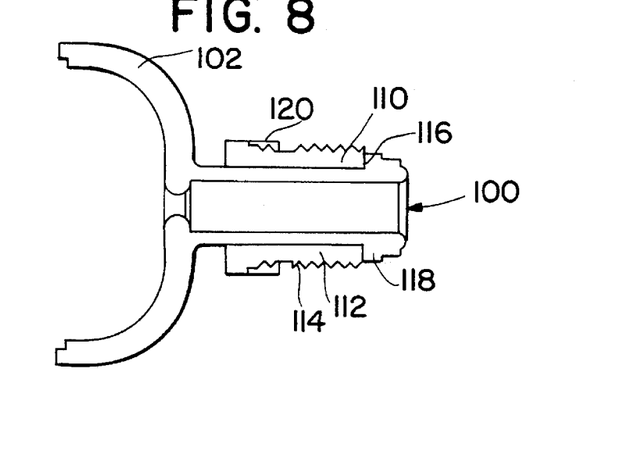
FIG. 8 is a longitudinal cross-sectional view of the assembled male nut assembly of FIG. 7.
Figure 9:
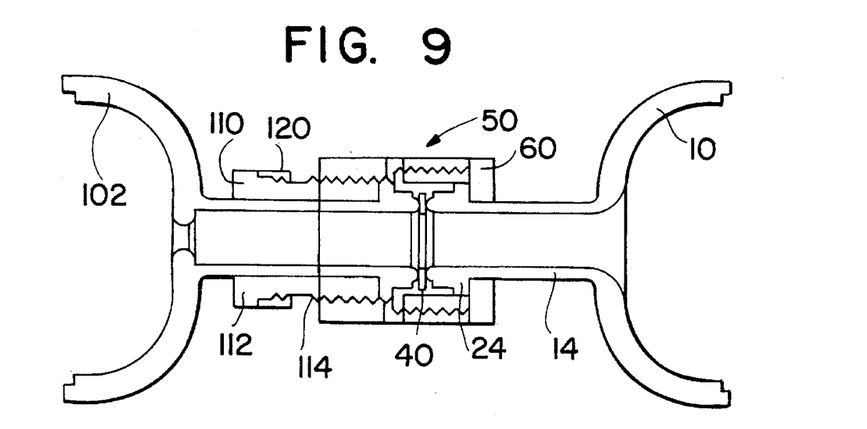
FIG. 9 is a cross-sectional view of an assembled fluid coupling employing split connection members in association with both coupling glands, that is a split female nut assembly and a split male nut assembly.
Figure 10A:
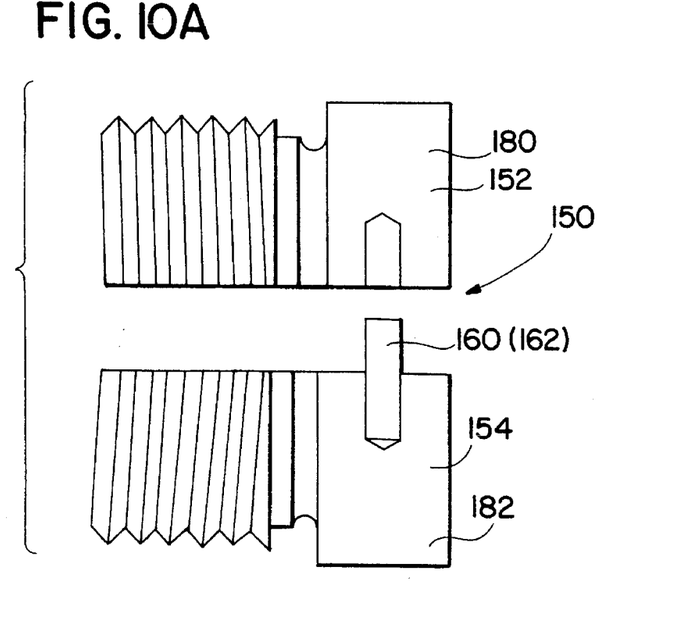
FIG. 10A is an exploded side elevational view of the mating components of another preferred split connection member, specifically a split male nut assembly.
Figure 10B:
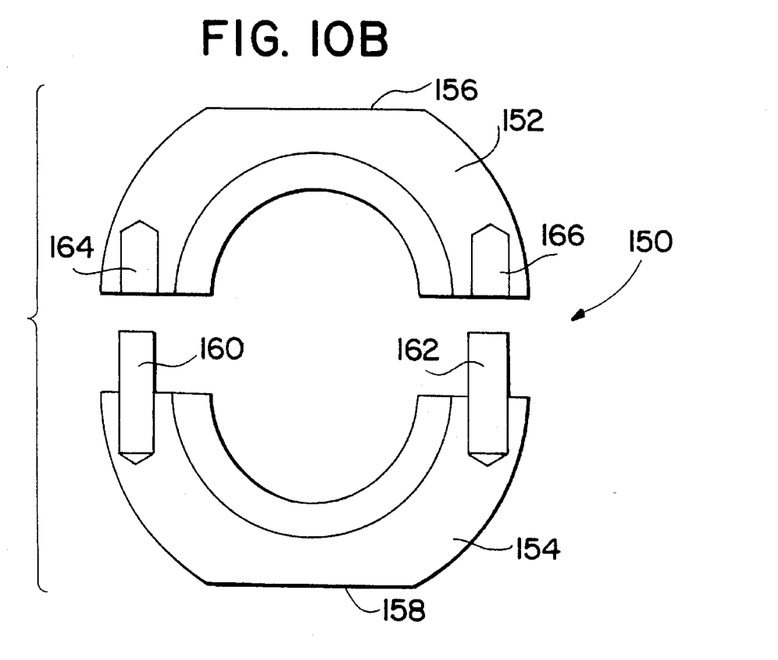
FIG. 10B is an end view of the components of FIG. 10A.
Figure 10C:
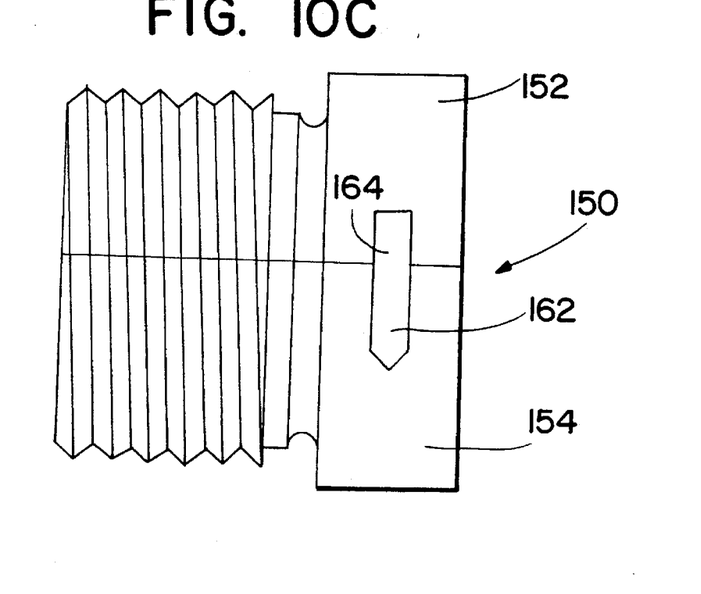
FIG. 10C is a side elevational view of the assembled connection member of FIG. 10A.
Figure 10D:
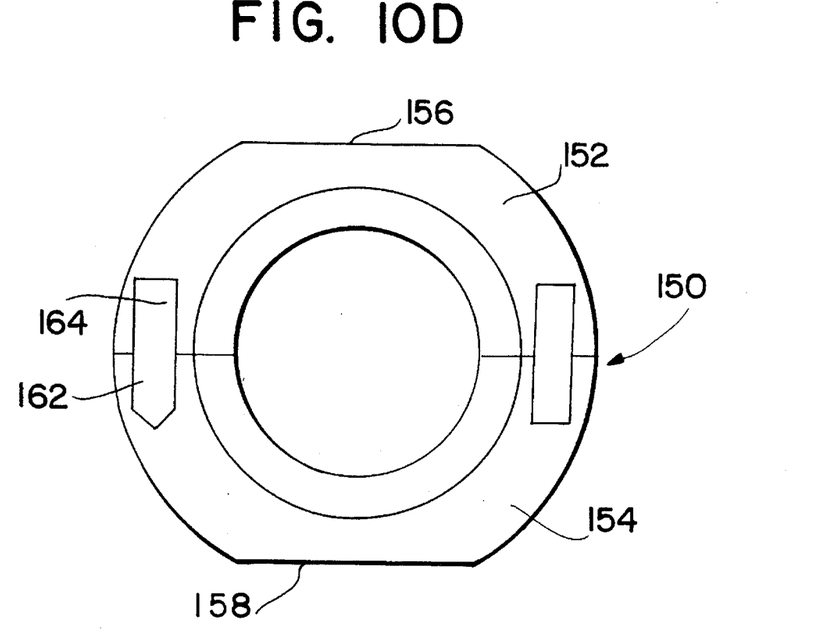
FIG. 10D is an end view of the assembled connection member of FIG. 10C.
Figure 10E:
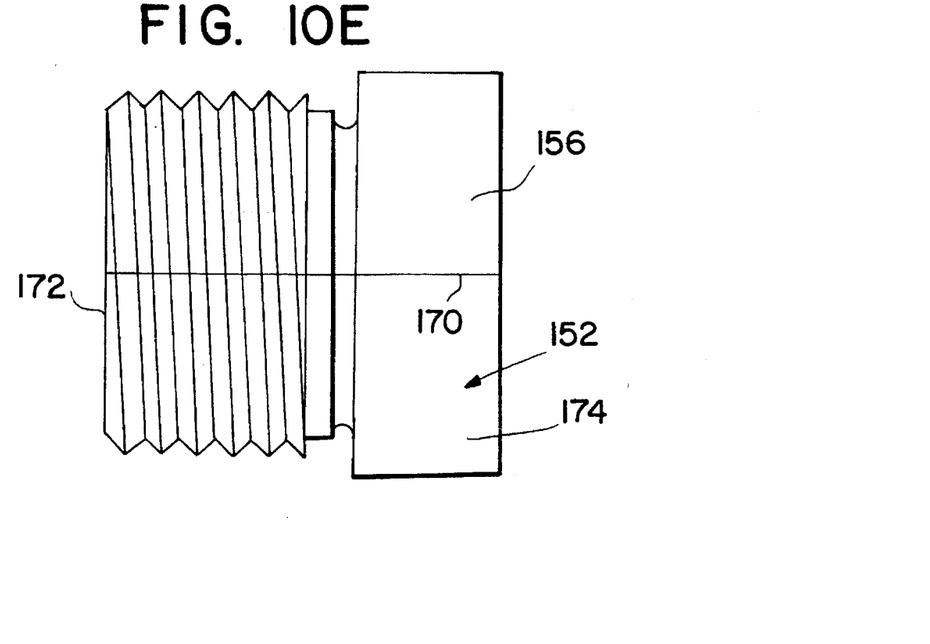
FIG. 10E is a plan view of the first component of the connection member of FIG. 10A.
Figure 11A:
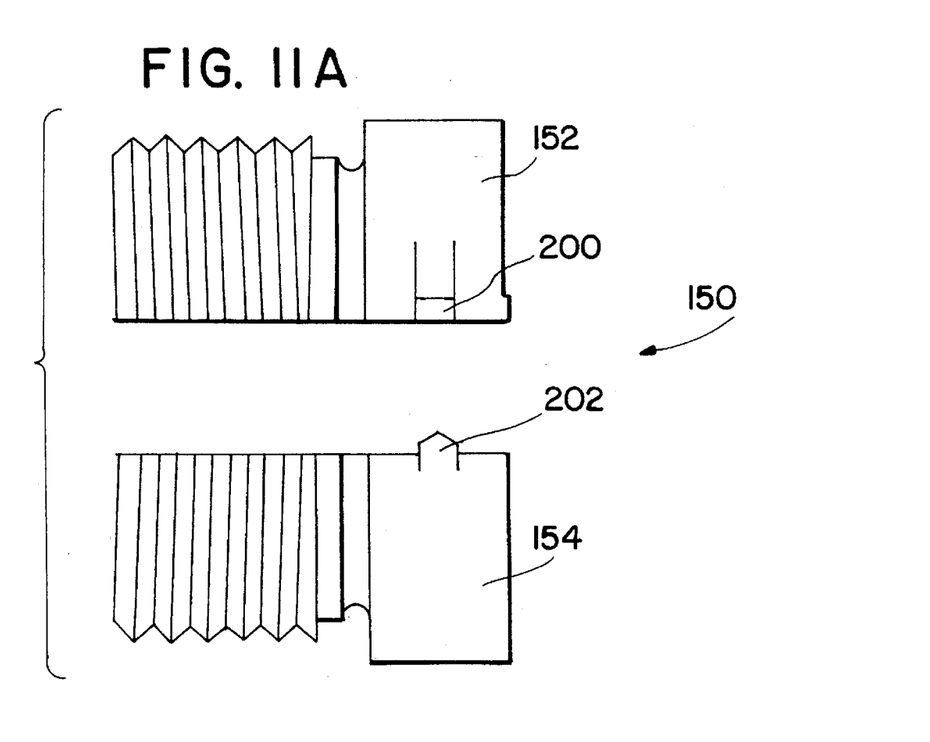
FIG. 11A is an exploded side elevational view of another preferred connection member, specifically another split male nut assembly.
Figures 11B, 11C, 11D:
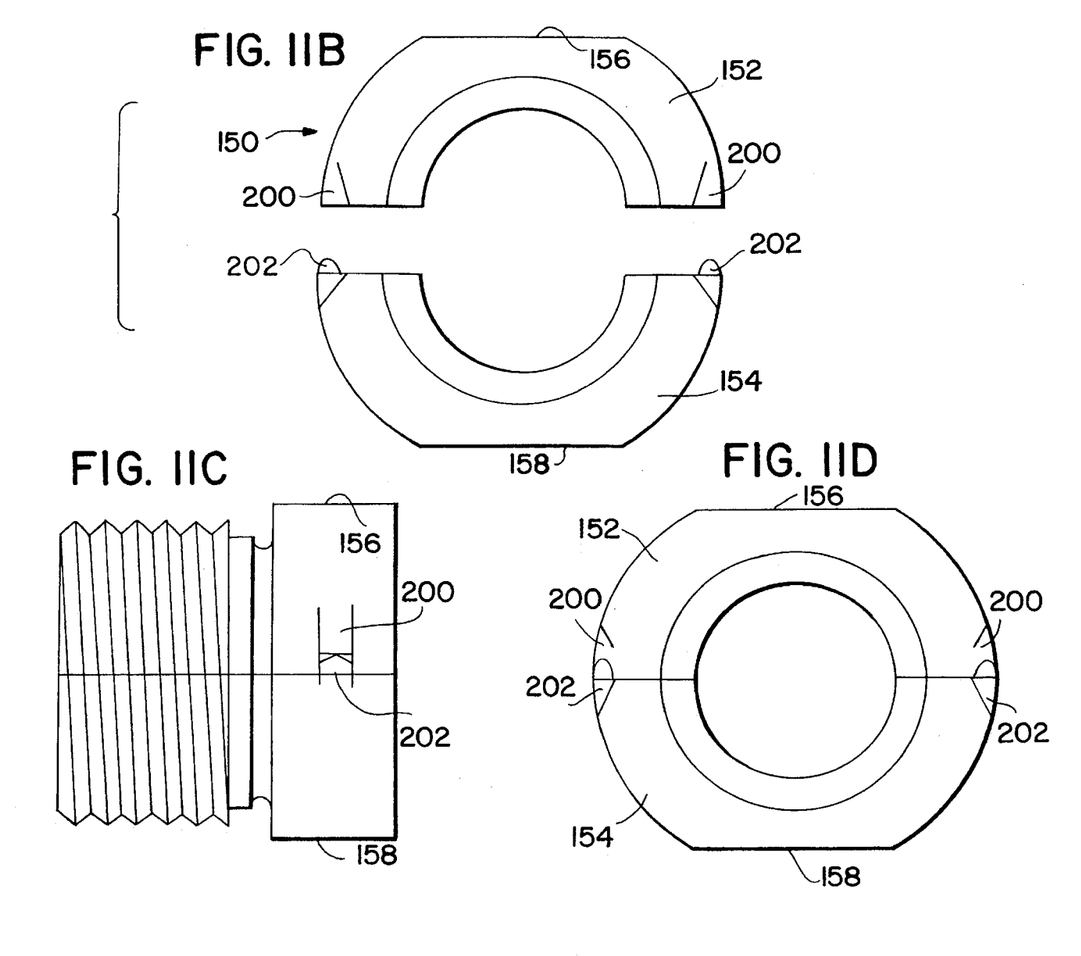
FIG. 11B is an end view of the connection member of FIG. 11A.
FIG. 11C is a side elevational view of the assembled connection member of FIG. 11A.
FIG. 11D is an end view of the assembled connection member of FIG. 11C.

FIGS. 7–9 illustrate the applicability of this invention to related coupling assemblies, i.e. a male nut assembly. Particularly, a second coupling gland 100 is integrally formed with a fluid component 102, such as by machining the second gland from the same stock that forms the fluid component. Also, the external threaded region 34 of the prior embodiment is eliminated with the embodiment of FIGS. 7–9 and instead the second coupling gland is identical to the previously described first coupling gland. Accordingly, the separate, split connection members or male split nut halves 110, 112 include an external threaded region 114 that together define the threads that cooperate with the internal threads of the female coupling nut associated with the first gland.

In the preferred arrangement as shown, one end of the split male nut halves define a radial shoulder 116 that abuttingly engages a radial shoulder 118 of the second gland. A retaining collar 120 is dimensioned for receipt over the seal face of the second gland and toward the shoulder for cooperative engagement with the split male nut halves. The retaining collar can be of any suitable construction such as a push-on ring (not shown) or a ring that is internally threaded at 122 for cooperation with an additional threaded region 124 on the split male nut halves. Any suitable structural arrangement that secures the split nut halves together and can be easily positioned in place over the second gland may be used in accordance with the teachings of this invention.

In accordance with a preferred embodiment of this invention, the individual halves of the split coupling assembly are formed of a precipitation hardenable stainless steel such as 17-4 PH stainless steel. This is a preferred material for use in special environments and it will be understood by one skilled in the art that other stainless steels could be used. Likewise, other thread pitch and hand specifications for the threaded regions can be used without departing from the overall scope and intent of the subject invention.

As indicated above, a major concern in the semiconductor industry is cleanliness and the elimination of particles that may be associated with the coupling assembly. Moreover, another problem of known coupling assemblies is that galling is a frequent problem resulting from mating components of the same material engaging one another. One solution to the galling problem in this particular ultra clean fluid environment has been to plate the threads of the coupling assembly with a thin layer of silver. Although the effects of galling are thereby limited, when the threads of the coupling assembly are engaged, the silver plating is removed from the cooperating threaded regions resulting in small particles that are undesirable in the ultra clean environment.

A preferred solution in accordance with the subject invention is to manufacture the female nut of the coupling assembly from a high silicon, high manganese, nitrogen strengthened austenitic stainless alloy. This material is preferred since it exhibits increased metal-to-metal wear resistance allowing the components of the coupling assembly to be formed from the same material, i.e. stainless steel, and without any intermediate material layer (such as a silver plating). As will be understood, use of this material is not limited to the split nut arrangements as described herein, but may also be equally applicable to coupling assemblies in general in this ultra clean environment. For example, the female nut 26 as described above with respect to the prior art embodiment of FIG. 1 can be modified and formed from a high silicon, high manganese, nitrogen strengthened austenitic stainless alloy.

Turning now to FIGS. 10A–10E, a split male nut 150 includes a first half 152 and a second half 154 that cooperate when assembled to define the male nut. The nut is preferably formed from two halves which are a pair of metal members sandwiched together. Tool flats 156, 158 are formed in the shoulder portions of the members and the flats are preferably disposed in parallel relation to the dividing plane between the male nut halves.

An alternate interconnecting or interlock arrangement to the retaining collar 120 described above with respect to the embodiment of FIGS. 7 and 8 is shown in FIGS. 10–13 to hold the members in place during formation of the threads, and also to provide accurate alignment of the halves after they have been separated. In one preferred embodiment illustrated in FIGS. 10A–10E, the interlock arrangement includes a pair of pins 160, 162 that are formed in one of the split male nut halves (e.g. 154) and received in cooperating recesses 164, 166 formed in the other of the male nut halves (e.g. 152). If desired, one pin and recess can be formed in each of the split nut halves for cooperation with a pin and recess in the other. In any event, the pins and recesses maintain the first and second male nut halves in desired, aligned relation so that the threads can be cut in the nut halves and the halves can be subsequently assembled after separation.

The threads are formed by providing indicia means such as a scribed line or mark 170, preferably on one of the two members. Preferably, the indicia means is oriented in parallel relation with the longitudinal axis of the nut, for example along the face of the first nut half (FIG. 10). The mark serves to orient the members in a CNC (computer numerical control) lathe where the position of the mark is determined or sensed and the thread cutting operation then begins at the end 172 of the members remote from the shoulder 174. A desired thread pitch, length, and hand is formed on the members as they are held together so that a continuous thread is formed on the exterior of the cooperating nut halves.

Additional markings or indicia 180, 182 are provided on the nut halves so that each first half is identified by the same marking 180 and each second half has a marking 182. Since each pair of members includes an indicia means 170 at the same location, the threads formed by the lathe on different member pairs results in interchangeable halves of the nut. That is, a first nut half 152 from one pair of members is compatible with a second nut half 154 from another pair of members. The thread portions on the halves align with one another so that it is not necessary to maintain the nut halves from a particular thread cutting operation together. This is important where the nut halves are subsequently treated, such as undergoing an electropolishing operation, or subsequently handled where it simply is not feasible to maintain the nut halves from a cutting operation together.

Another preferred interlocking arrangement is shown in FIGS. 11A–11D. For ease of reference, like numerals will refer to like parts and new numerals refer to new elements. A pair of machined notches 200 in the first nut half cooperate with swedged tabs 202 in the second nut half to provide an effective interlock arrangement. Again, the interlock arrangement provides desired alignment between the nut halves during the threading operation and also facilitates accurate joinder of the nut halves after the threading operation has been completed.

Figure 12:
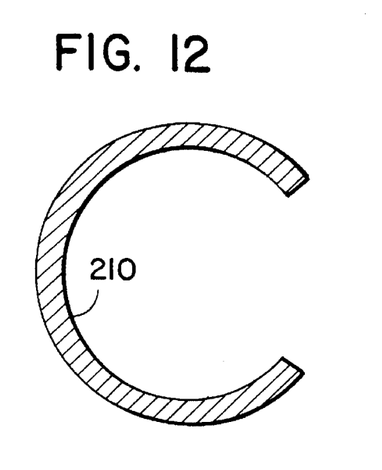
FIG. 12 shows a band used as an alternative means for interconnecting a split connection member shown as the split male nut assembly.
Figure 13:
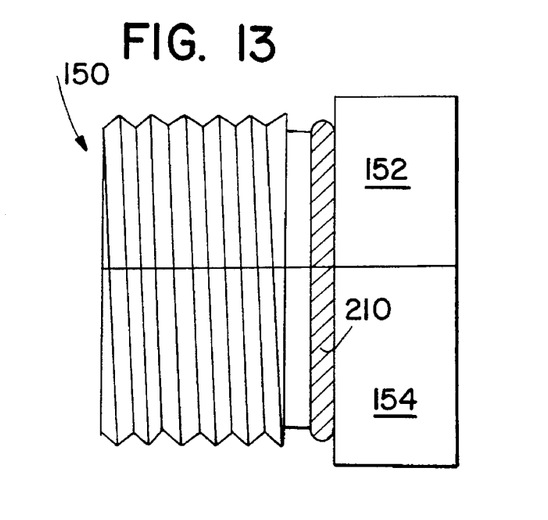
FIG. 13 is an elevational view of an assembled connection member using the clip of FIG. 12.

FIGS. 12 and 13 illustrate use of a band such as a flexible wire clip 210 holding the nut halves together. This allows an installer of the coupling assembly to position the nut halves over the gland and then secure them in place on the gland while a female nut is then advanced over the gland shoulder and threadably engaged with the external threads of the male nut. It will also be understood that the wire clip has a C-shape and sufficient flexibility and resilience to snap-fit over the cooperating nut halves from a direction generally perpendicular to the longitudinal axis of the nut. Moreover, the wire clip can be used in conjunction with the interlocking arrangements of FIGS. 10 and 11.

Figure 14:
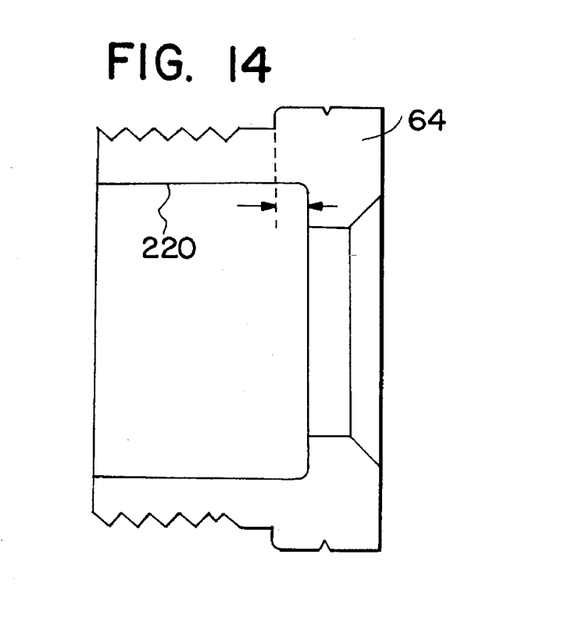
FIG. 14 is a longitudinal cross-sectional view of a modified connection member, particularly an assembled pair of split insert halves of a female nut assembly having increased strength.

The cross-sectional view of FIG. 14 shows a modification in the female nut assembly that adds increased strength to the split insert portion thereof. Particularly, the original design as shown in FIGS. 2 and 3 terminated the counterbore 72 in the split inserts in substantially the same plane as the radial face of shoulder 64 that is disposed closest to the threads. It has been found, however, that substantial strength is obtained by providing an overlap between the shoulder and counterbore as represented by numeral 220. This structural arrangement provides increased resistance to bending under large forces imposed on the coupling assembly. It is estimated that the new design is approximately ten times stronger than the original design.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a fluid coupling of the type including first and second glands, each gland having a longitudinal fluid passage therethrough that terminates in an end face that extends generally perpendicular to the fluid passage, each end face extending toward the other end face for forming a sealed joint therebetween, a shoulder of a first predetermined diameter on the first gland spaced axially inwardly from the end face and a male nut assembly having a second predetermined diameter less than the first predetermined diameter that abuts against the first gland shoulder, and the male nut assembly having external threads for selective engagement with a female nut operatively associated with the second gland, the male nut assembly of the first member being positioned over the first gland in a direction from the end face toward the shoulder, the female nut including a pair of externally threaded inserts and a collar having a first internally threaded region joining the inserts together and a second internally threaded region for selectively mating to the external threads of the male nut assembly.

2. The invention as defined in claim 1 wherein the female nut has an internal shoulder defined by a counterbore that extends axially inward from one end thereof and an external portion of the shoulder overlaps the counterbore in the direction of the one end to provide increased strength to the female nut.

3. The invention as defined in claim 1 wherein at least a portion of the female nut is formed of a high silicon, nitrogen strengthened, austenitic stainless alloy for increased wear resistance.

4. The invention as defined in claim 1 wherein the inserts of the female nut are formed of a precipitation hardenable stainless steel.

5. The invention as defined in claim 1 wherein the male nut assembly is formed of a precipitation hardenable stainless steel.

6. The invention as defined in claim 1 wherein the male nut assembly is split longitudinally into first and second components that cooperate to allow the male nut assembly to be positioned over the first gland.

7. The invention as defined in claim 6 further comprising a band adapted for receipt around the first and second components for holding the components together during assembly of the male nut assembly.

8. The invention as defined in claim 7 wherein the band is a C-shaped flexible clip.

9. The invention as defined in claim 6 wherein the first and second components include an interlock assembly that includes a projection extending from the first component and a recess in the second component that receives the projection and aligns the first and second components together.

10. The invention as defined in claim 9 wherein the projection extending from the first component is a swedged tab.

11. The invention as defined in claim 9 further comprising a band adapted for receipt around the first and second component for holding the components together during assembly of the male nut assembly.

12. The invention as defined in claim 11 wherein the band is a C-shaped flexible clip.

13. A coupling assembly for an ultra clean environment wherein the coupling assembly includes first and second glands each having a longitudinal fluid passage therethrough that terminates in an end face that extends generally perpendicular to the fluid passage, each end face extending toward the other end face for forming a sealed joint therebetween, a shoulder of a first predetermined diameter on the first gland spaced axially inward from the end face and a male nut having a second predetermined diameter less than the first predetermined diameter that cooperates with the first gland shoulder, the male nut being longitudinally split into first and second components that cooperate to allow the male nut assembly to be axially advanced over the first gland in a direction from the end face toward the shoulder and the male nut being externally threaded for selective engagement with an internally threaded female nut operatively associated with the second gland, the female nut including a pair of longitudinally split inserts that cooperate with a collar having a shoulder defined by a counterbore extending axially inward from one end and an external portion of the shoulder overlapping the counterbore in the direction of the one end to provide increased strength to the female nut assembly, and the female nut being formed from a high silicon, nitrogen strengthened, austenitic stainless alloy for increased wear resistance.

* * * * *